United States Patent
Nakai

(10) Patent No.: US 8,307,363 B2
(45) Date of Patent: Nov. 6, 2012

(54) VIRTUAL MACHINE SYSTEM, RESTARTING METHOD OF VIRTUAL MACHINE AND SYSTEM

(75) Inventor: Hidehiko Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 3 days.

(21) Appl. No.: 12/862,214

(22) Filed: Aug. 24, 2010

(65) Prior Publication Data

US 2011/0066879 A1    Mar. 17, 2011

(30) Foreign Application Priority Data

Sep. 11, 2009   (JP) ................................. 2009-209918

(51) Int. Cl.
*G06F 9/455* (2006.01)
*G06F 9/46* (2006.01)
*G06F 13/00* (2006.01)
*G06F 11/00* (2006.01)

(52) U.S. Cl. ............ 718/1; 718/100; 718/108; 711/100; 714/1

(58) Field of Classification Search ........................ None
See application file for complete search history.

(56) References Cited

U.S. PATENT DOCUMENTS

| 6,205,450 | B1 | 3/2001 | Kanome | |
| 6,795,966 | B1* | 9/2004 | Lim et al. | 718/100 |
| 7,840,963 | B2* | 11/2010 | Traut | 718/108 |
| 2008/0022032 | A1* | 1/2008 | Nicholas et al. | 711/100 |
| 2008/0189700 | A1* | 8/2008 | Schmidt et al. | 718/1 |

FOREIGN PATENT DOCUMENTS

| JP | 11-134117 | 5/1999 |
| JP | 2008-052407 | 3/2008 |

* cited by examiner

*Primary Examiner* — Meng An
*Assistant Examiner* — Bing Zhao
(74) *Attorney, Agent, or Firm* — Staas & Halsey LLP

(57) ABSTRACT

A virtual machine system includes a first operating system for operating a virtual machine, a first manager for controlling to divide a physical resource into a plurality of virtual resources and assign at least one of the plurality of virtual resources as a unit to the virtual machine, the physical resource including at least a central processing unit and a memory, and a second operating system for controlling the first operating system, the second operating system being connected to a storage unit.

16 Claims, 10 Drawing Sheets

| GUEST IDENTIFIER (31) | STATE OF GUEST (32) | STATE OF SNAPSHOT PROCESSING (33) | DATE AND TIME OF UPDATE GENERATION OF SNAPSHOT (34) | NUMBER OF SNAPSHOTS (35) | ADDRESS OF MEMORY-COPIED AREA (36) | FLAG FOR COMPLETION OF DISK COPY (37) |
|---|---|---|---|---|---|---|
| 10 | OPERATING | GENERATING SNAPSHOT | 03.03.2009 12:00.00 | 10 | MCTA0 | 0 |
| 20 | STOPPING | – | 03.01.2009 20:00.00 | 5 | MCTA1 | 0 |
| 25 | SUSPENDING | RECONSTRUCTING SNAPSHOT | 03.02.2009 18:00.00 | 5 | MCTA1 | 0 |
| 50 | STOPPING | – | 03.03.2009 19:00.00 | 5 | MCTA2 | 0 |
| 70 | OPERATING | GENERATING SNAPSHOT | 03.05.2009 11:00.00 | 3 | MCTA3 | 1 |

36-1

| VIRTUAL PAGE ADDRESS | FLAG FOR COMPLETION OF COPY |
|---|---|
| VPA0 | 0 |
| VPA1 | 1 |
| VPA2 | 1 |

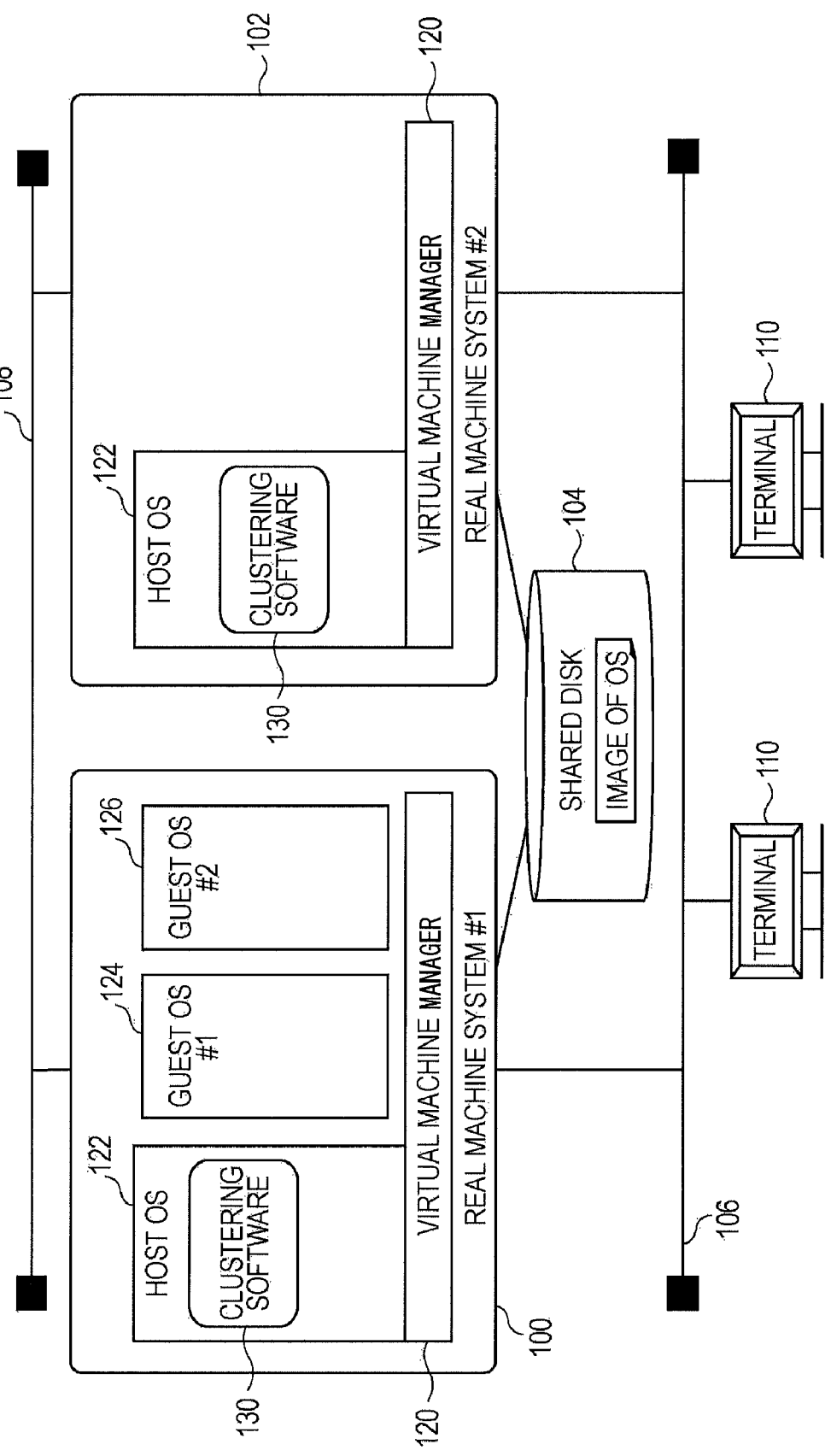

VIRTUAL MACHINE SYSTEM, RESTARTING METHOD OF VIRTUAL MACHINE AND SYSTEM

CROSS-REFERENCE TO RELATED APPLICATION

This application is based upon and claims the benefit of priority of the prior Japanese Patent Application No. 2009-209918 filed on Sep. 11, 2009, the entire contents of which are incorporated herein by reference.

FIELD

The embodiments discussed herein are related to virtual machine systems, restarting method of virtual machines and systems.

BACKGROUND

In order to reduce the costs for Information Technology (IT) infrastructures, the use of virtualization technologies have been demanded for more efficient use of resources and reduction of operation costs. Virtual machine systems have begun to be adopted in which one physical server is used to host a plurality of virtual servers.

For example, a business system operating on many physical servers may be virtualized by using virtualization software to intensively implement the system on fewer physical servers. This may reduce the adoption and operation costs for the physical servers.

Such a virtual machine system implements a plurality of virtual server functions with a plurality of virtual machines (guest OSs) controlled by a host OS. A failure of a virtual machine in the virtual machine system however may possibly terminate the system.

Real machine systems use clustering technologies (or clustering systems) by which when a system terminates, the system is replaced by another equivalent system to transfer its jobs for higher reliability and higher usability. In other words, in order to prevent termination of jobs, a clustering system is used for redundant machine systems.

On the other hand, virtual machine systems using clustering systems have been proposed in which virtual machines executing jobs are clustered for redundancy, like physical servers, and a host OS controlling the virtual machines is clustered to recover the virtual machines.

FIG. 10 is an explanatory diagram of a virtual machine system.

As illustrated in FIG. 10, the virtual machine system includes in a real machine system 100 a virtual machine manager (virtualization software) 120, a host operating system (OS) 122, and a plurality of virtual machines (guest operating systems (OSs)) 124 and 126. The host OS 122 is provided for controlling the guest OSs 124 and 126. The virtual machine manager 120 virtualizes and controls the host OS 122 and guest OSs.

In such a virtual machine system, the termination of one guest OS (virtual machine) due to its failure prevents the continuous operation of a business application being executed by the guest OS. In order to avoid the situation, as illustrated in FIG. 10, an equivalently configured real machine system 102 is provided. Then, data are exchanged through a shared disk device 104. This is called a clustering-type hot standby/cluster system.

In other words, the second real machine system 102 having the virtual machine manager 120 and the host OS 122 is connected to the first real machine system 100 over a local area network (LAN) 106 and over a heart beat network 108 for failure notifications.

The LAN 106 connects to a plurality of terminals 110. Thus, even when a guest OS (such as the guest OS 126) in the first real machine system 100 fails and terminates, the guest OS 126 is started under the control of the host OS 122 in the second real machine system 102 to resume the job of the guest OS 126.

However, such clustering system makes the host OS and virtual machines redundant. This requires a standby system and a shared disk device separately from the operating system, which may increase the costs for the systems. It further requires clustering system software 130 and setting the software.

The clustering system stores in a disk a snapshot that is the contents of the memory and/or disk of a guest OS when its service starts upon completion of the start of a job or application for omission of the time for starting, the guest OS and application and reduction of the recovery time. However, since the snapshot upon start of the service is only available, the guest OS may only be recovered from the time when the job or service by the guest OS starts. This prevents users from starting the job from an arbitrarily designated recovery point.

The use of data replication cluster in which data is replicated with a local disk for synchronizing files (OS Images) may cause differences (or contradictions) in contents of the files when one machine system shuts down during the synchronization, for example. This may contrarily increase the time for recovering the job.

[Patent Document 1] Japanese Laid-open Patent Publication No. 2008-052407

[Patent Document 2] Japanese Laid-open Patent Publication No. 11-134117

SUMMARY

According to an aspect of an embodiment, a virtual machine system includes a first operating system for operating a virtual machine, a first manager for controlling to divide a physical resource into a plurality of virtual resources and assign at least one of the plurality of virtual resources as a unit to the virtual machine, the physical resource including at least a central processing unit and a memory, and a second operating system for controlling the first operating system, the second operating system being connected to a storage unit, the second operating system including a detector for detecting an occurrence of a failure in the first operating system, and a second manager for controlling to obtain information stored in the assigned one of the plurality of the virtual resources intermittently or periodically as a snapshot of the first operating system, store the snapshot in the storage unit, and restore the first operating system by using the snapshot upon a detection of the failure in the first operating system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an explanatory diagram of a virtual machine system.

DESCRIPTION OF EMBODIMENTS

Exemplary embodiments of a virtual machine system, snapshot generating processing and recovery processing will be described in this order. However, the virtual machine system is not limited to the embodiments.

Figure 1:
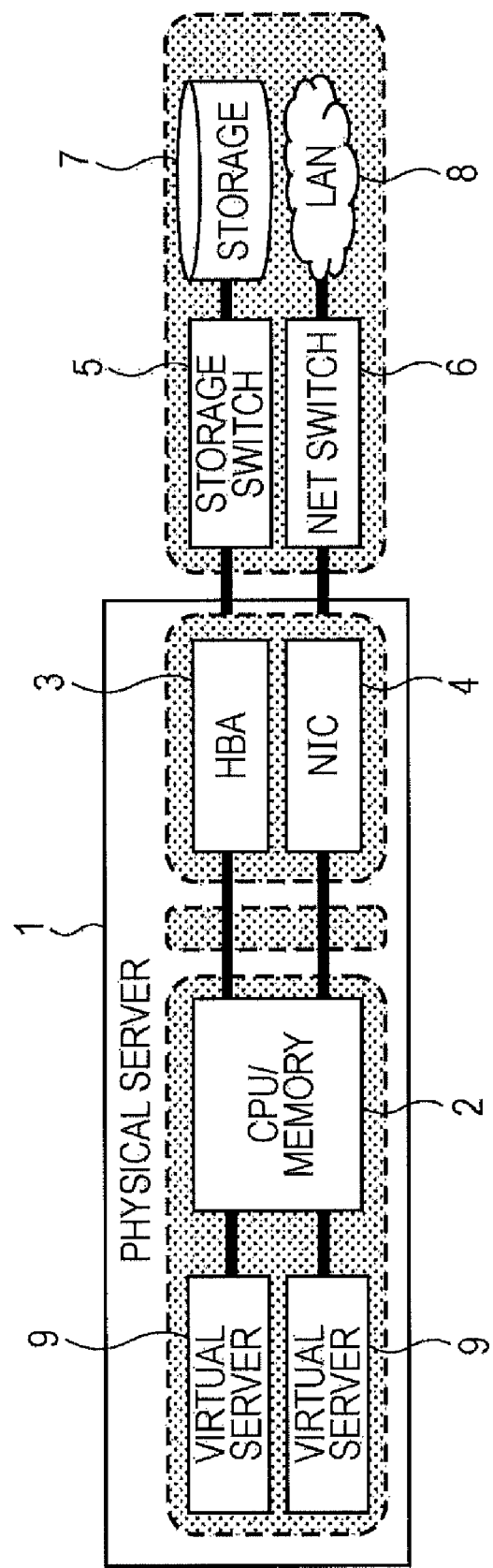
FIG. 1 is a physical block diagram of an embodiment of a virtual machine system.
Figure 2:
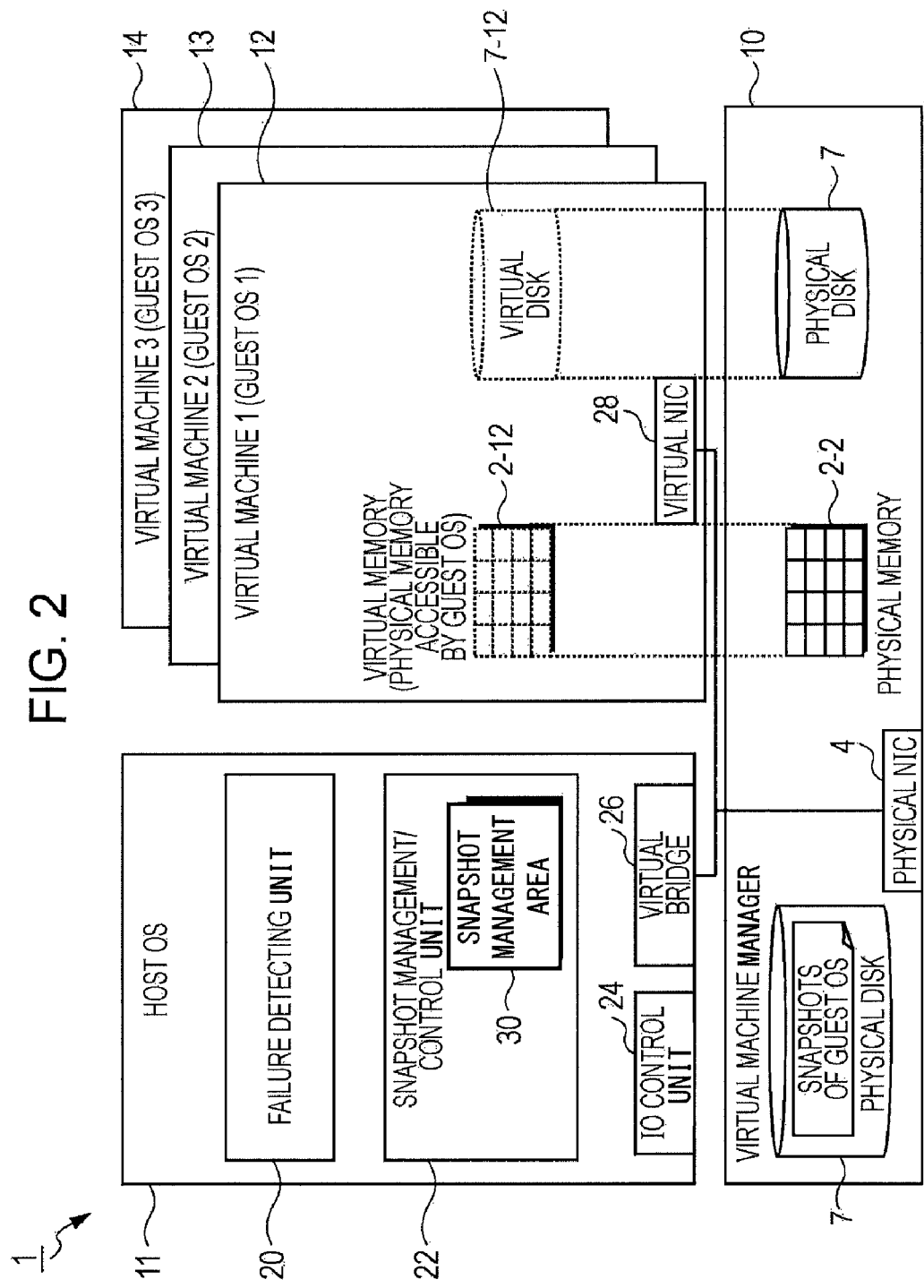
FIG. 2 is a functional block diagram of software of the virtual machine system in FIG. 1.
Figure 3:
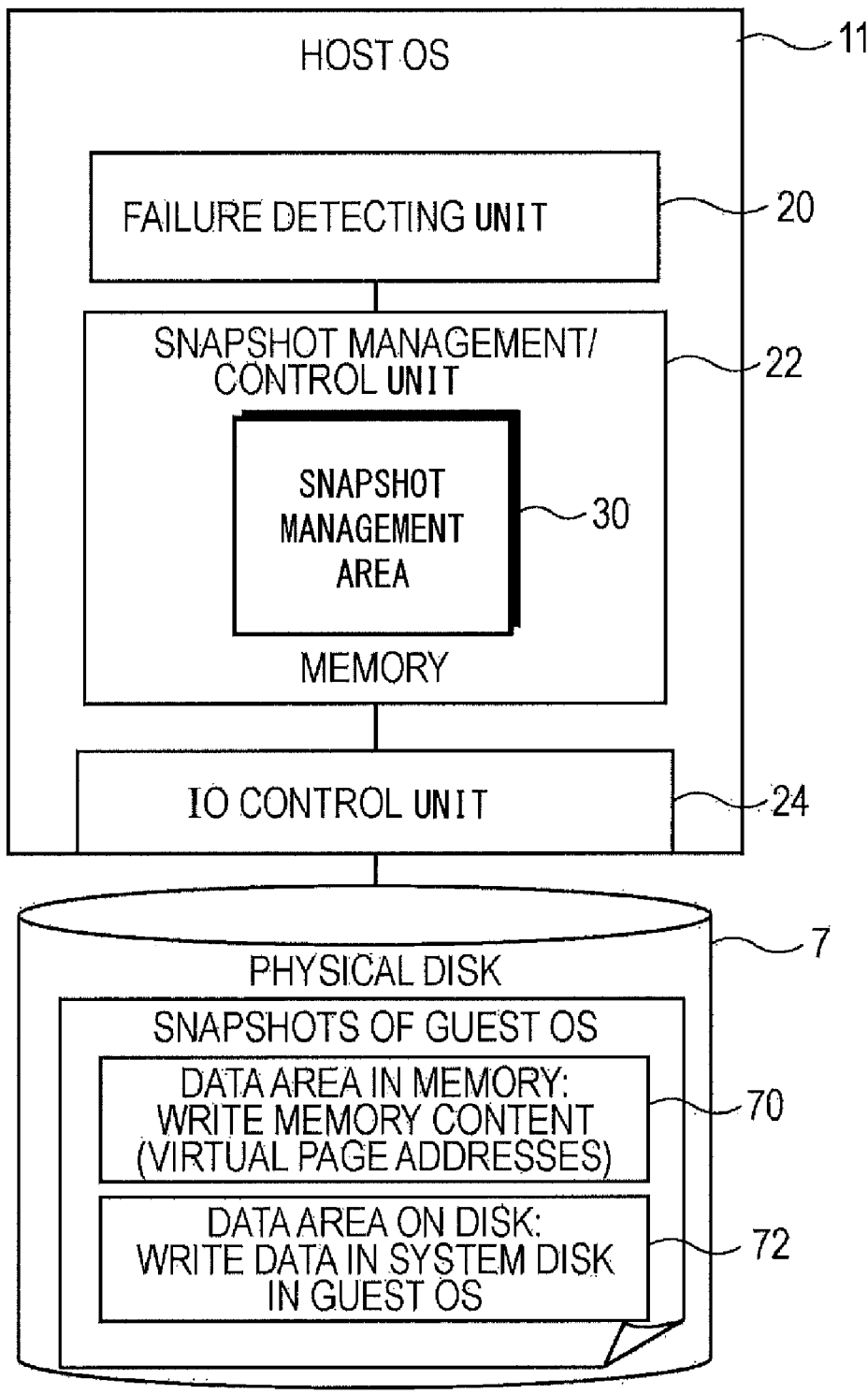
FIG. 3 is a functional block diagram of the host OS in FIG. 2.
Figure 4:
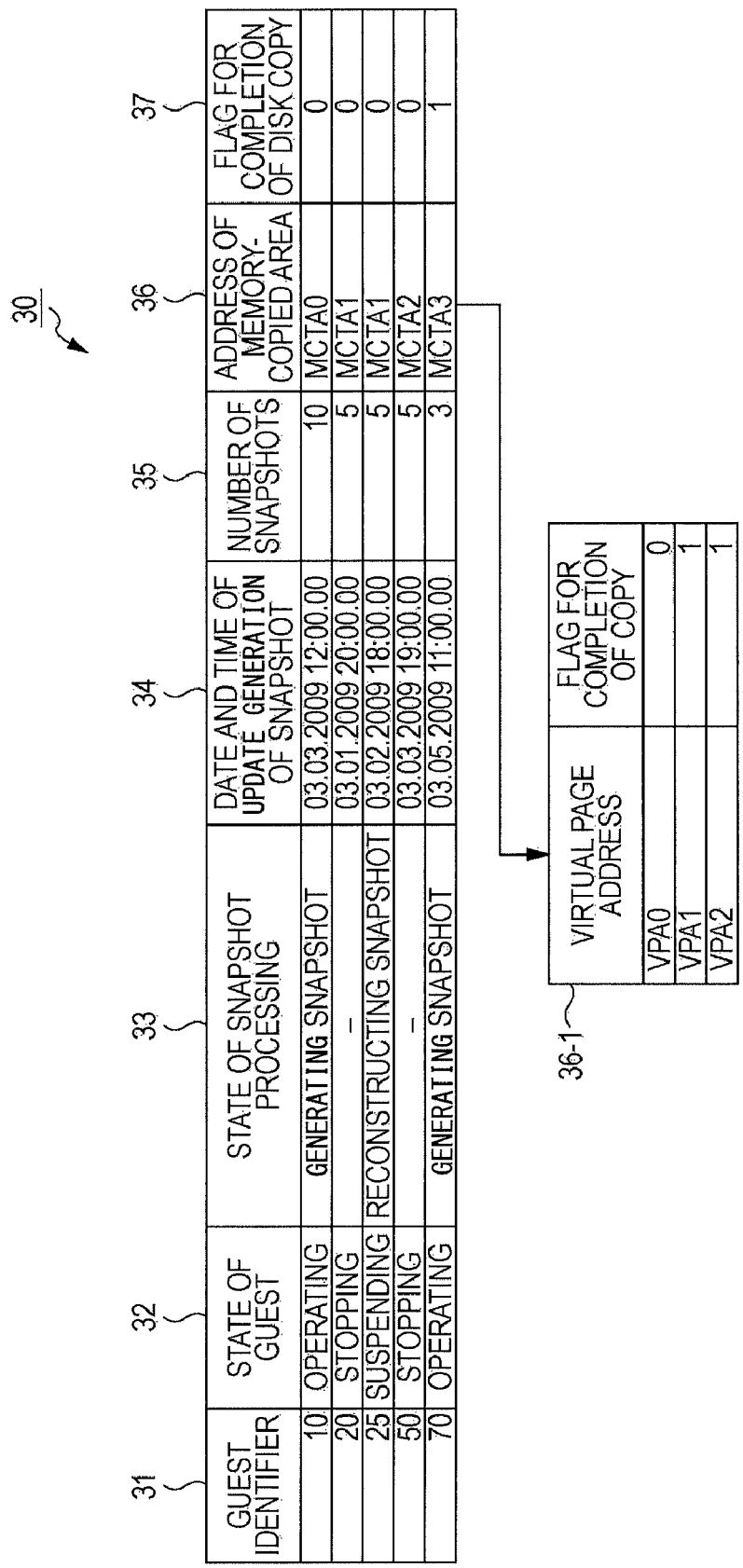
FIG. 4 is an explanatory diagram of the snapshot management area in FIGS. 2 and 3.

FIG. 1 is a physical block diagram of an embodiment of a virtual machine system. FIG. 2 is a functional block diagram of software of the virtual machine system in FIG. 1. FIG. 3 is a functional block diagram of the host OS in FIG. 2. FIG. 4 is an explanatory diagram of the snapshot management area in FIGS. 2 and 3.

As illustrated in FIG. 1, a physical server (real machine) 1 has hardware including at least one CPU/memory 2, a bus adapter (such as a fiber channel host bus adaptor or FC-HBA) 3, and a network controller (network interface controller or NIC) 4.

The bus adapter (HBA) 3 connects to a storage device 7 such as a disk device through a storage switch 5. The network interface card (NIC) 4 connects to a local area network (LAN) 8 through a net switch 6.

Comparing with the physical hardware, the virtualization software illustrated in FIG. 2 may be provided so that the physical server 1 may host a plurality of virtual servers 9. As illustrated in FIG. 2, for example, the virtualization software causes the CPU/memory 2 to function as a virtual server for virtualization of the relationship between the server 1 and I/O devices, which are storage switch 5, storage device 7 and net switch 6.

For example, virtualization of the connection of the I/O adapter with a switch/virtualization device such as virtualization of addresses of the HBA 3 and NIC 4, and setting of access rights of I/O devices such as storage switch 5, storage device 7 and net switch 6 may simplify assignment and change of I/O resources to the servers and replacement of servers.

With reference to FIG. 2, software for the virtual machines will be described. The virtual machine manager 10 is a core of the virtualization software. The virtual machine manager 10 divides physical resources such as the CPU/memory 2 (where the memory 2-2 is only illustrated), network interface card (NIC) 4, net switch 6, and disk devices such as storage switch 5 and storage device 7 into virtual resources. The virtual machine manager 10 then assigns the virtual resource divisions to virtual machines (guest OSs) 12 to 14. For example, VMware (product name), HyperV (product name) or Xen (product name) may be applicable.

A host OS 11 controls the virtual machines 12 to 14. The guest OSs 12 to 14 may be well-known OSs such as Linux (trademark) and WINDOWS (registered trademark).

The host OS 11 functionally includes a failure detecting unit 20, a snapshot management/control unit 22, a virtual I/O control unit 24, and a virtual bridge 26. On the other hand, each of the virtual machines 12 to 14 includes a virtual NIC 28. Each of the virtual machines 12 to 14 virtually connects to the physical NIC 4 through a virtual bridge 26 in the host OS 11.

The failure detecting unit 20 controls a failure/stop of the virtual machines 12 to 14. The failure detecting unit 20 notifies information corresponding to a condition of the virtual machines to the snapshot management/control unit 22. The information may indicate whether each of the virtual machines is operating or not. The snapshot management/control unit 22 generates snapshots of the designated virtual machine in accordance with instructions or requests, or at a predetermined interval. The snapshot management/control unit 22 resumes the virtual machine from the snapshots. The snapshot management/control unit 22 operates by, referring and updating information in a snapshot management area 30 provided in a memory area of the host OS. The snapshot management area 30 will be described below with reference to FIG. 4.

The IO control unit 24 uses the host OS 11 and virtual machine manager 7 to control and process inputs to and outputs from the virtual machines 12 to 14 between the virtual machines 12 to 14 and the physical devices, such as the network interface card (NIC) 4, net switch 6, and disk devices such as the storage switch 5 and storage device 7.

The virtual bridge 26 is a component of the virtual network. The virtual bridge 26 is a bridge module on the host OS 11 (management OS). The guest OSs 12 to 14 are operating systems operating on virtual machines. The guest OSs 12 to 14 execute application software. The virtual NIC 28 is an interface included in the network shared by the host OS 11 and guest OSs 12 to 14.

With reference to FIGS. 3 and 4, the snapshot management/control unit 22 in the host OS 11 will be described. As illustrated in FIG. 4, the snapshot management area 30 has guest identifiers 31 for uniquely identifying virtual machines that operate on the host OS 11. The snapshot management area 30 holds information, for each of the guest identifiers, including a state of guest OS 32, a state of snapshot processing 33, the date and time the latest generation of snapshots 34, the number of snapshots 35, an address of memory-copied areas 36 and a flag for completion of disk copy 37. The state of guest OS 32 may indicate whether the guest OS is operating, stopped or suspended. The state of snapshot processing 33 may include information indicating whether the snapshot management/control unit 22 is generating the snapshot, or is reconstructing the snapshot.

The address of memory-copied area 36 holds the address indicating the memory-copied area holding having copy-completion flag 36-1. The copy-completion flag 36-1 indicates whether the contents of virtual memory 2-12 of the guest OSs 12 to 14, which is physical memory accessible by the guest OSs, have been copied to an memory area in the host OS 11, which is a memory-data copied area for the guest OSs, for each page (or virtual page address).

The flag for completion of disk copy 37 holds information (flag) indicating whether copy has been completed to the data area in the disk device 7 for storing snapshots or not.

As illustrated in FIG. 3, the host OS 11 stores the snapshots of the guest OSs 12 to 14 to the local physical disk device 7 in the host OS for reference. Snapshots may be stored in association with a storage function of SAN (Storage Area Network) or NAS (Network Area Storage), for example.

The snapshots of the guest OSs 12 to 14 may hold data in registers of the CPUs of the guest OSs, data areas of the memory 2-12 holding memory contents, or the system disk 7-12 for the guest OSs, for example. The snapshot management/control unit 22 in the host OS 11 deploys the snapshot management area 30 in the memory of the host OS 11. The snapshot management/control unit 22 controls snapshot generating processing and recovery processing.

The snapshot generating processing and recovery processing in the host OS 11 will be described. The host OS 11 stores contents in the CPU, memory 2-2 and disk device 7 used by the guest OSs 12 to 14 in the virtual machines, or data in data areas of the memory for snapshots, to the memory 2-2 that is controlled by the host OS 11 at a preset constant time interval or in accordance with a request from an interface that is used for designating a recovery point from the guest OSs 12 to 14 to the host OS 11.

In the storing operation, the host OS 11 monitors input/output processing such as inputs to and outputs from the memory 2-12 for the guest OSs 12 to 14. The host OS 11 generates snapshots such that the information of the memory 2-12 and input/output processing and the contents of the memory 2-12 and disk 7-12, for example, do not contradict each other.

When generating a new snapshot, the host OS 11 stores the snapshot currently stored in the memory to the disk device 7. The host OS 11 stores several generations of the snapshots cyclically. The number of generations of the snapshots to be controlled is changeable in setting.

The failure detecting unit 20 detects that one of the guest OSs 12 to 14 has a failure and shuts down (or stops). Then, the host OS 11 uses the update snapshot (or pre-designated snapshot) of the guest OS stored in the memory to resume the virtual machine and switch to the virtual machine that has stopped for continuation of the job. Immediately before the guest OS resumes, the host OS 11 checks whether the guest OS may be started without any problems or not. Then, the host OS 11 performs time adjustment for the virtual machine.

If a snapshot of the guest OS is not resumed, the host OS 11 uses the snapshot of one previous generation that is stored in the disk device 7 or a pre-designated snapshot, and resumes the guest OS.

Figure 5:
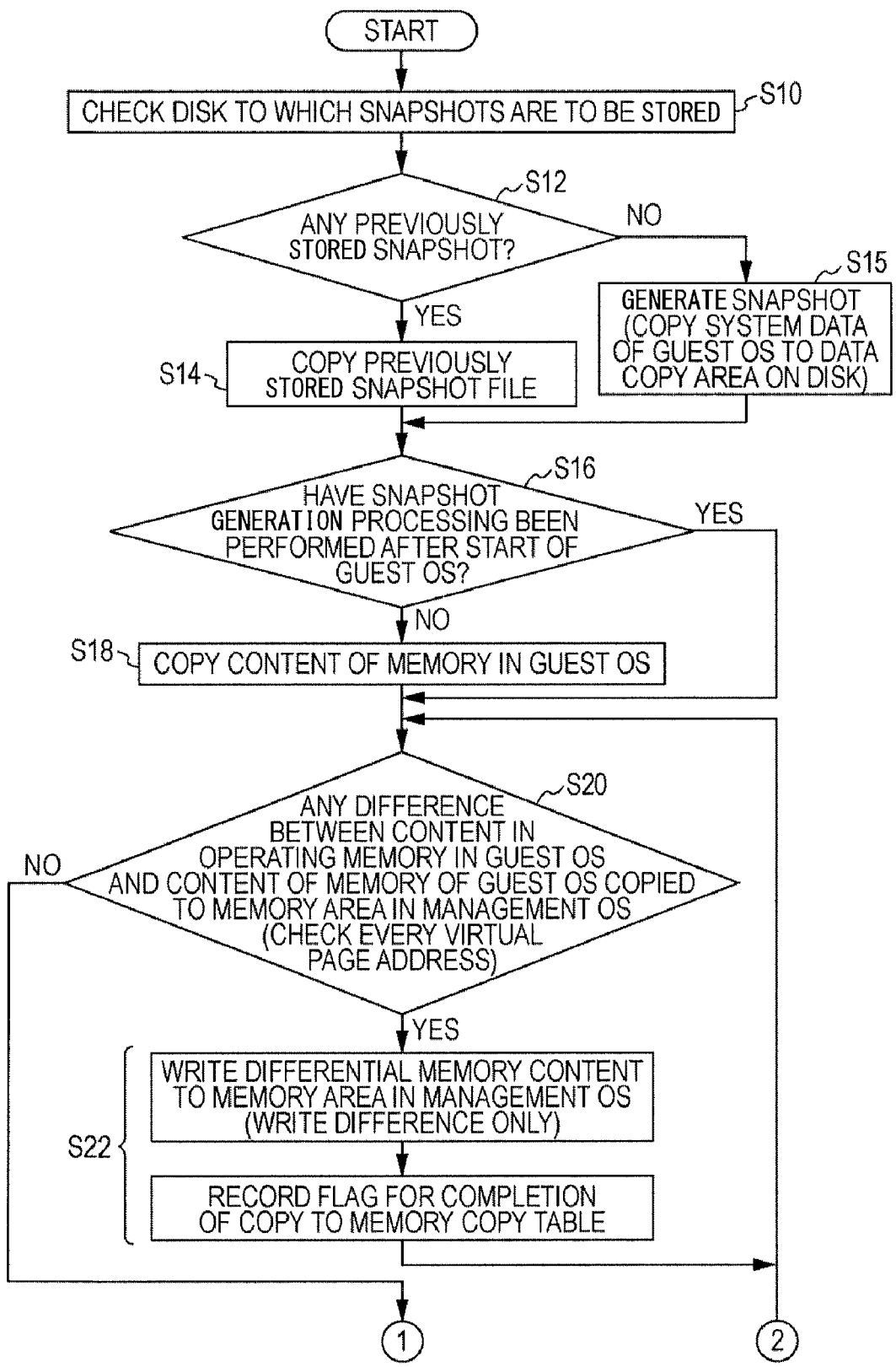
FIG. 5 is a processing flow diagram (Part 1) of snapshot generating processing according to an embodiment.
Figure 6:
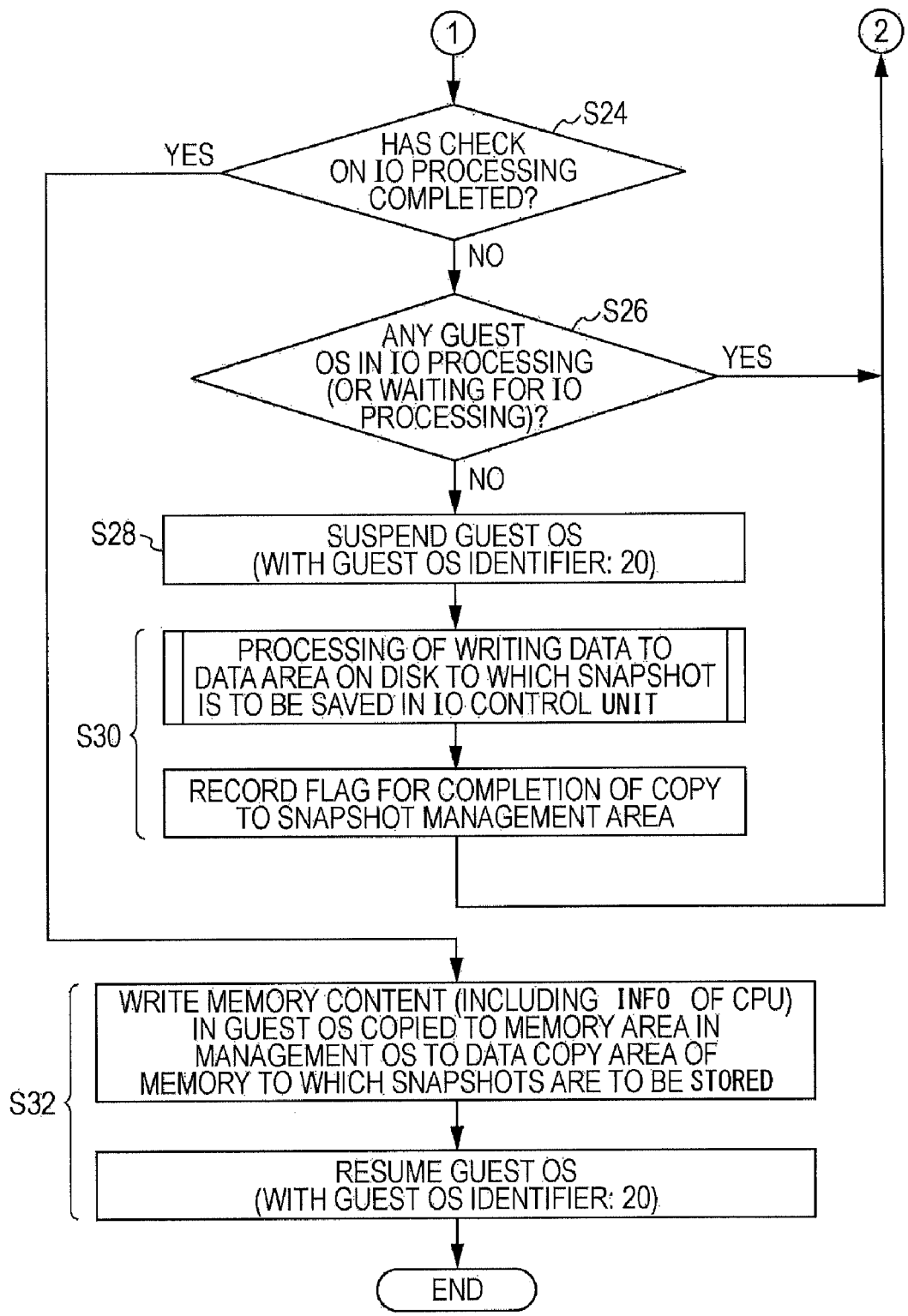
FIG. 6 is a processing flow diagram (Part 2) of snapshot generating processing according to an embodiment.
Figure 7:
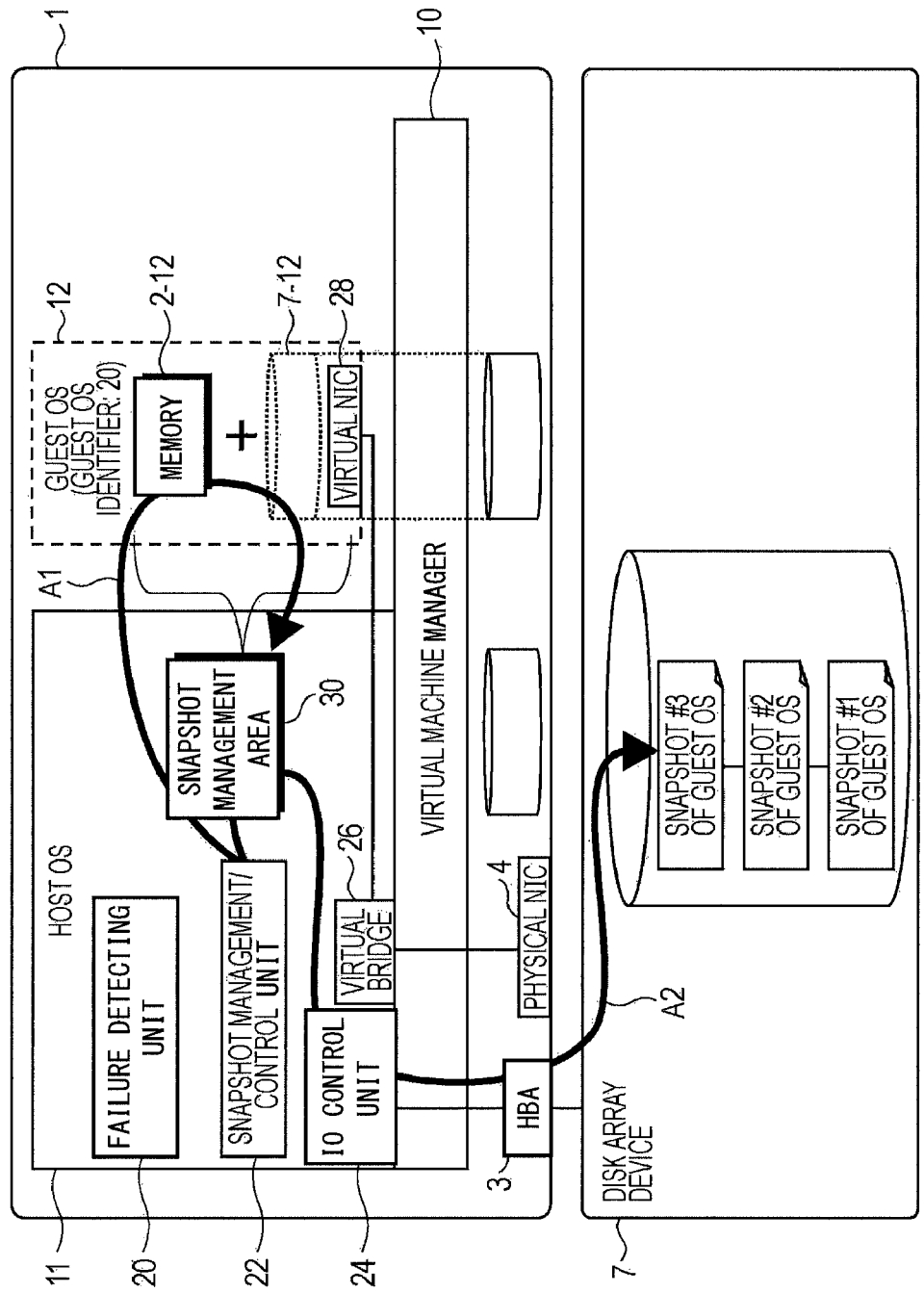
FIG. 7 is an explanatory operation diagram of the snapshot generating processing.

FIGS. 5 and 6 are processing flow diagrams of snapshot generating processing according to an embodiment. FIG. 7 is an explanatory operation diagram of the snapshot generating processing.

With reference to FIG. 7, the snapshot generating processing in FIGS. 5 and 6 will be described below.

The snapshot management/control unit 22 will be called "host OS 11" in the following description. After the guest OS with the guest OS identifier: 20 is started, the host OS 11 checks the disk capacity of the disk device 7 to which snapshots are to be stored after a lapse of the time preset in the operation settings for the virtual machines at S10. Otherwise, the host OS 11 checks the disk capacity of the disk device 7 in accordance with a request from the interface that is used for designating the recovery point from the guest OS to the host OS 11.

At S12, if the destination disk has no problems as a result of the check at S10, the host OS 11 refers to the number of snapshots 35 in the snapshot management area 30. Then, the host OS 11 checks whether the disk device 7 has any snapshot file of the same guest OSs that have been previously stored or not. If not, the host OS 11 moves to S15.

At S14, if the host OS 11 determines that some previously stored snapshot file exists for the same guest OS, the host OS 11 copies the stored snapshot and generates a new snapshot.

At S15, if the host OS 11 determines that no previously stored snapshot file exists for the same guest OS, the host OS 11 generates a new snapshot. Then, the host OS 11 writes the system data of the guest OS to a data copy area in the disk for snapshots.

At S16, after the start of the guest OS with the guest OS identifier 20, the host OS 11 determines whether the snapshot generating processing has been performed or not with reference to the number of snapshots 35 in the snapshot management area 30. If so, the host OS 11 moves to S20.

If the snapshot generating processing is not performed, the host OS 11 copies and stores the content of the memory 2-12 for the guest OS with the guest OS identifier 20 to the memory area, which is a memory-data copied area for the guest OS in the host OS 11 at S18.

At S20, the host OS 11 obtains the memory content of the target operating guest QS. Then, the host OS 11 compares the memory content for the guest OS and the memory content copied or stored in a memory area of the host OS 11, which is the memory content at the time of generating the last snapshot, for each virtual page address. Then, the host OS 11 determines whether any difference between the snapshots exists or not. If no difference exists between the snapshots, the host OS 11 determines that memory content has not changed and moves to S24.

At S22, if any difference between the snapshots is detected, that is, if the memory for the guest OS has an updated area at some detected virtual page address, the host OS 11 only writes a part of the snapshot that has been changed, which is the difference from the last snapshot, to the memory area, which is a data copy area for the memory of the guest OS, of the host OS 11. At that time, the snapshot management/control unit 22 records the copy-completion flag 36-1 of the management area 30 to the memory area in order to prevent copying old memory data and to indicate the completion of copy. When some area (virtual page address) exists where the memory has not been updated but only been referred, the copy table 36-1 in the management area 30 for the memory is referred. Then nothing is performed if the area has been copied already. If the area has not been copied, the memory content is written to the memory area, which is the guest OS-data copied area, of the host OS 11. Returning back to S20, the processing in S22 is performed on each virtual page address until no difference exists between the memory contents.

Next, at S24, the host OS 11 checks whether the check on I/O processing by the guest OS with the guest OS identifier 20 has been completed or not. If the check on I/O processing has been completed, the host OS 11 moves to S32.

At S26, the host OS 11 checks whether the guest OS with the guest OS identifier: 20 is performing I/O processing, or waiting for I/O processing, or not. If the host OS 11 is performing I/O processing, the host OS 11 returns to S20.

At S28, if the host OS 11 determines that the check has not been completed and determines that the guest OS is not waiting for I/O processing, the host OS 11 suspends the guest OS with the guest OS identifier: 20. In other words, the current processing information is maintained.

At S30, the host OS 11 requests the I/O control unit 24 to perform I/O processing. Then, the host OS 30 writes the data in the virtual disk 7-12 to a data area 72 in the disk device 7 that stores snapshots of the guest OS with the guest OS identifier: 20. The I/O control unit 24 in the host OS 11 only writes the changed part from the snapshot in the data copy area in the disk. Upon completion of the processing by the I/O control unit 24, the host OS 11 records the flag for completion of the disk copy 37 of the snapshot management area 30. The host OS 11 records the flag in order to prevent re-copying of the same disk data from the I/O control unit 24 and to indicate the completion of copy. Then, the host OS 11 returns to S20.

At S32, if the host OS 11 determines that the guest OS has completed the check operated during I/O processing, the host OS 11 stores the memory content of the guest OS (including the data in a register in the CPU) copied to the memory area of the host OS 11 to a snapshot 70 for the guest in the disk device 7. At that time, the host OS 11 checks the integrity between the memory content of the guest OS with the guest OS identifier: 20 generated as a snapshot, and the content of the disk subject to I/O processing such as inputs and outputs and other information. Then, the host OS 11 resumes the guest OS with the guest OS identifier: 20. Then, the host OS 11 ends the processing.

With reference to FIG. 7, operations will be described. In order to generate a snapshot of the guest OS 12, the snapshot management/control unit 22 in the host OS 11 monitors the information of the virtual machine. Then, the snapshot management/control unit 22 performs the following processing.

In response to a start instruction, the host OS 11 starts the guest OS 12 with the guest OS identifier: 20. Then, the snapshot management/control unit 22 in the host OS 11 performs processing of generating a snapshot of the guest OS at pre-determined intervals in the operation settings for the virtual machine. Otherwise, the snapshot management/control unit 22 performs the processing of generating the snapshot of the guest OS in response to a request from the interface that is used for designating the recovery point from the guest OS 12 to the host OS 11.

The snapshot management/control unit 22 monitors the information of the guest OS. Then, the snapshot management/control unit 22 generates a snapshot by only storing the difference from the last stored data in the contents of the memory 2-12 and disk 7-12 (arrow A1). The generated snapshot in this case does not contradict with the operating information of the guest OS without updates and input/output processing on the memory of the guest OS.

In other words, referring to FIGS. 5 and 6, when the guest OS does not await input/output processing, or does not access to the disk, the guest OS is suspended, and the data in the disk is stored (S30). When the check on the I/O processing on the guest OS is completed, the data in the memory (including a register in the CPU) are stored (S32). Since only the difference from the last stored data in the memory and disk is stored, the time for storing the snapshot may be reduced though it is an enormous volume of data.

Before generating the next snapshot, the snapshot management/control unit 22 stores the data stored in the memory/disk (snapshot) to the disk device 7 (arrow A2). The disk device 7 holds snapshots of the guest OS for generations, such as five generations.

Figure 8:
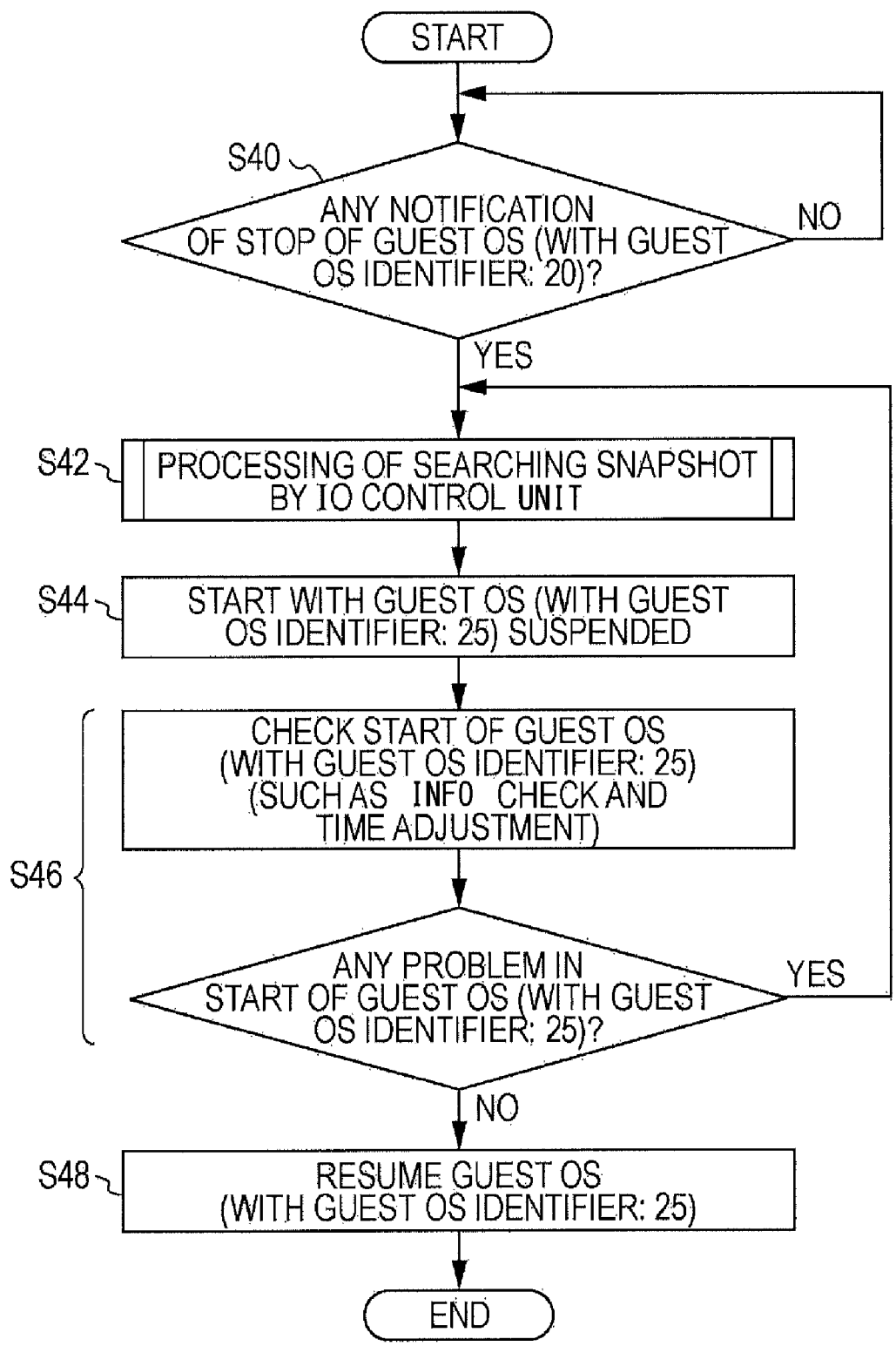
FIG. 8 is a processing flow diagram on recovery processing of an embodiment.
Figure 9:
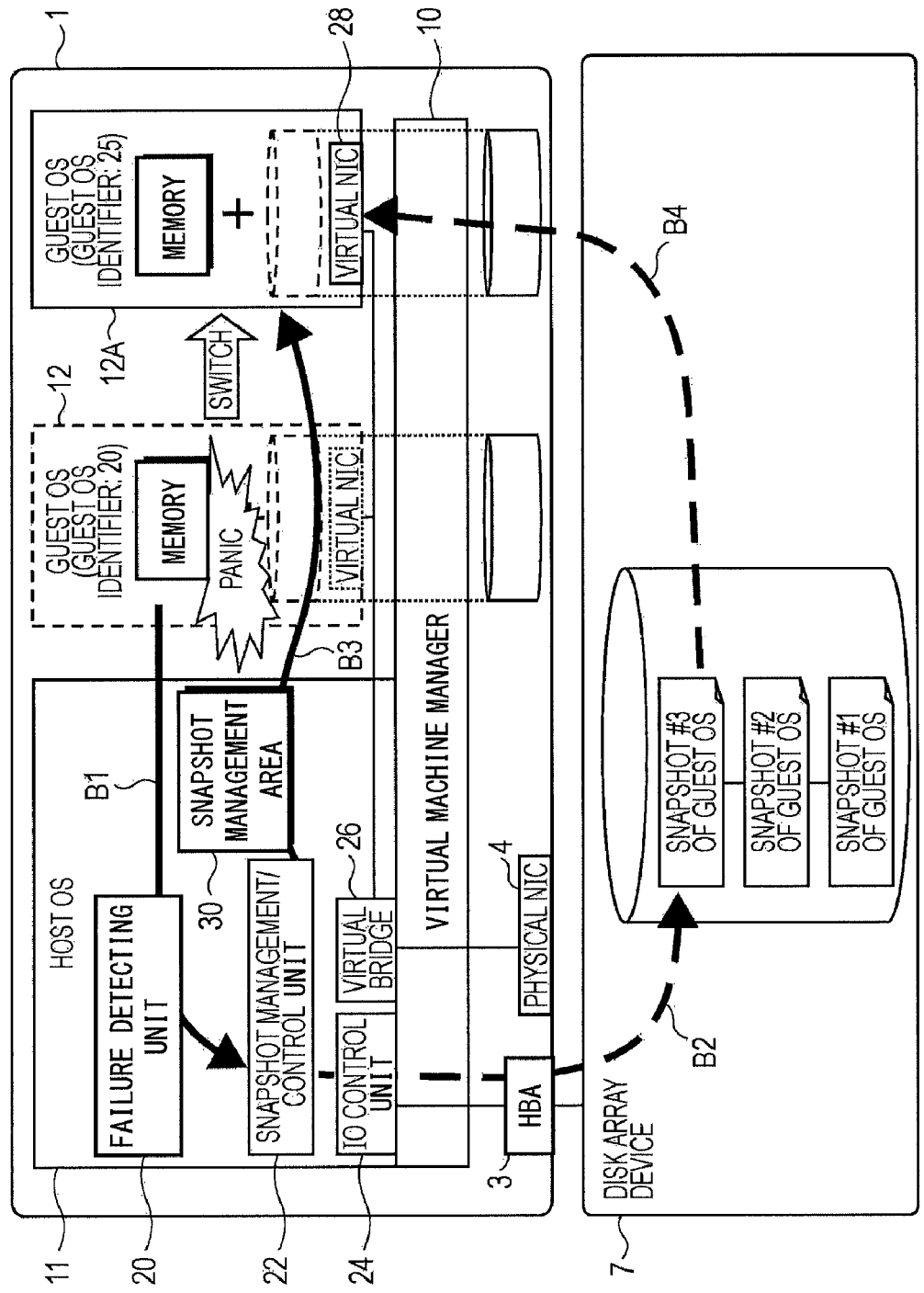
FIG. 9 is an explanatory operation diagram of the recovery processing in FIG. 8.

FIG. 8 is a processing flow diagram on recovery processing of an embodiment. FIG. 9 is an explanatory operation diagram of the recovery processing. With reference to FIG. 9, the recovery processing in FIG. 8 will be described.

After detection of a failure (or stop) of the virtual machine 12, the snapshot management/control unit 22 in the host OS 11 uses the stored snapshots of the guest OS 12 to perform the recovery processing as follows:

At S40, if the failure detecting unit 20 in the host OS 11 detects that the guest OS with the guest OS identifier: 20 has panicked and stopped, the failure detecting unit 20 notifies the detection result to the snapshot management/control unit 22 (arrow B1 in FIG. 9).

At S42, the snapshot management/control unit 22 requests the I/O control unit 24 to search the latest updated snapshot of the guest OS stored to the disk device 7 (arrow B2 in FIG. 9).

At S44, the snapshot management/control unit 22 uses the updated snapshot, or pre-designated snapshot, within the disk device 7 of the guest OS (with the guest OS identifier: 20). The updated snapshot of the guest OS is notified by the I/O control unit 24 to reconstruct the data in the memory and disk and the information of the CPU stored in the snapshot. Then, the snapshot management/control unit 22 starts the guest OS 12A (guest OS identifier: 25) suspended (arrow B3 in FIG. 9).

At S46, the snapshot management/control unit 22 checks whether the guest OS 12A with the guest OS identifier 25 may be started without problems or not. In other words, after checking that the data in the memory and other information of the guest OS 12A do not contradict each other, the snapshot management/control unit 22 measures the time difference and performs time adjustment (step/slew). If the guest OS 12A with the guest OS identifier: 25 fails to start or has a problem, the snapshot management/control unit 22 returns to S42 and requests the I/O control unit 24 to search the snapshot of the guest OS that is one generation before the stored latest snapshot, or a pre-designated snapshot (arrow B4 in FIG. 9).

At S48, if the guest OS 12A successfully starts, the snapshot management/control unit 22 resumes the guest OS 12A. Then, the snapshot management/control unit 22 switches to the stopped (or failed) virtual machine for restarting the job.

In this way, the virtual machine may be recovered without redundant host OSs and virtual machines. This may contribute to the reduction of costs without software for standby systems, shared disk devices and clustering systems.

Since the contents of the memory and/or disk of the guest OS performing a job or application are stored as a snapshot, the guest OS may be recovered from the time immediately before the guest OS stops owing to a failure. Therefore, a user may start the job from an arbitrarily designated recovery point.

Even that, a snapshot of the guest OS is generated which does not contradict with the operating information of the guest OS without update and input/output processing on the memories of the guest OS. Thus, the guest OS may be resumed without differences or contradictions after restarted. Furthermore, since the difference is stored as a snapshot, the time for storing the snapshot though it is an enormous volume of data.

A guest OS may be recovered by generating snapshots from the content the memory and disk of the guest OS at constant intervals pre-designated to the host OS. Thus, the latest snapshot before the guest OS stops is used so that the job of the guest OS may be restarted immediately.

This example may be suitable for jobs in information-related systems, for example, that allow restart of a job by re-execution of the application the execution of which has resulted in an error after the stop of the job.

Furthermore, the application for the job that operates on a guest OS may be allowed to control in detail including the timing for generating snapshots of the guest OS and which snapshot of the guest OS is to be used.

For example, instructing to generate a snapshot immediately before a job is started or upon completion of a series of job processing steps allows control over matching between starting points of recovery after the stop of the system. Thus, from the time of completion of normal processing immediately before a job stops, the job may be restarted for quick recovery.

This example may be suitable for jobs in banking-related systems that require high reliability and do not allow continuation of a job when the execution of the application results in an error after the job stops.

Having described the embodiments in which snapshots are used when a disk device is used as the storage device therefor, other storage devices may be used such as solid state disk (SSD) devices with semiconductor storage devices.

The data in the CPU and memories assigned to a designated guest OS are obtained at designated times or at predetermined time intervals, and snapshots are generated therefrom. Then, the snapshots are stored in a storage device. In response to detection of a failure in the guest OS, the snapshots stored in the storage device are used to recover the guest OS. Thus, the guest OS may be recovered from the time immediately before the guest OS stops owing to the failure without redundant host OSs and virtual machines.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present invention have been described in detail, it should be understood that the various changes, substitutions, and alterations could be made hereto without departing from the spirit and scope of the invention.

What is claimed is:

1. A computer comprising:
  a first memory, and
  a processor to execute a process including;
    dividing a physical resource into a plurality of virtual resources, the physical resource including at least a central processing unit and a second memory;
    assigning at least one of the plurality of virtual resources to a virtual machine;
    detecting, by operating a second operating system, an occurrence of a failure in a first operating system that operates the virtual machine;
    obtaining, by operating the second operating system, data being stored in the assigned one of the plurality of the virtual resources intermittently or periodically as a snapshot of the first operating system;
    storing, by operating the second operating system, the snapshot in the first memory; and
    restoring, by operating the second operating system, the first operating system
  by reconstructing the snapshot stored in the first memory upon a detection of the failure in the first operating system,
  wherein the storing is performed by starting the first operating system by using an update or a pre-designated snapshot on a condition that the first operating system is suspended, and resuming the first operating system on a condition that the first operating system is started, and
  wherein a plurality of snapshots are chronologically stored in the first memory.

2. The computer according to claim 1, comprising:
  a second manager to store the snapshot in the first memory on a condition that a central processing unit being assigned to the virtual machine does not execute an input or output process to/from the first memory and on a condition that an update of a memory being assigned to the virtual machine is not executed.

3. The computer according to claim 1, comprising:
  a second manager to control:
    selecting an update or pre-designated snapshot from among a plurality of snapshots, and
    restoring the first operating system by using the update or pre-designated snapshot.

4. The virtual machine system according to claim 3, wherein
  the second manager controls to start the first operating system by using the update or pre-designated snapshot on a condition that the first operating system is suspended by the second manager, and resumes the first operating system on a condition that the first operating system is started by the second manager.

5. The computer according to claim 4, wherein
  when the second manager detects a failure of the start of the first operating system, the second manager controls to start the first operating system by using another snapshot except for the update or pre-designated snapshot, the another snapshot stored in the first memory, on a condition that the first operating system is suspended by the second manager.

6. The computer according to claim 1, comprising:
  a second manager to control:
  generating an update snapshot on a basis of a difference between the data and a previously generated snapshot stored in the first memory.

7. The computer according to claim 1, wherein
  the physical resource includes a disk apparatus connected to the central processing unit and being used by the central processing unit,
  a first manager to assign at least one of the virtual resources including the disk apparatus to the virtual machine, and
  a second manager to obtain information stored in the assigned virtual resource corresponding to the virtual machine intermittently or periodically, and generate an update snapshot on a basis of the obtained data.

8. The computer according to claim 7, wherein
  the second manager stores each of the data of the central processing unit, the memory and the disk apparatus as respective snapshots in a different management area of the first memory.

9. A restarting method for a virtual machine using a computer, the restarting method comprising:
  dividing a physical resource into a plurality of virtual resources, the physical resource including at least a central processing unit and a second memory;
  assigning at least one of the plurality of virtual resources to a virtual machine;
  detecting, by operating a second operating system, an occurrence of a failure in a first operating system that operates the virtual machine;
  obtaining, by operating the second operating system, data being stored in the assigned one of the plurality of the virtual resources intermittently or periodically as a snapshot of the first operating system;
  storing, by operating the second operating system, the snapshot in a first memory; and
  restoring, by operating the second operating system, the first operating system by reconstructing the snapshot stored in the first memory upon a detection of the failure in the first operating system,
  wherein the storing is performed by starting the first operating system by using an update or a pre-designated snapshot on a condition that the first operating system is suspended, and resuming the first operating system on a condition that the first operating system is started, and wherein a plurality of snapshots are chronologically stored in the first memory.

10. The restarting method according to claim 9, wherein the storing the snapshot in the first memory connected to the first operating system is performed by storing the snapshot in the first memory on a condition that the central processing unit being assigned to the virtual machine does not execute an input or output process to/from the first memory and on a condition that an update of a memory assigned to the virtual machine is not executed.

11. The restarting method according to claim 9, wherein the restoring is performed by selecting the update or the pre-designated snapshot from among the plurality of snapshots, and restoring the first operating system by using the update or pre-designated snapshot.

12. The restarting method according to claim 9, wherein the storing is performed by generating an update snapshot on a basis of a difference between the data and the previously generated snapshot stored in the first memory.

13. The restarting method according to claim 9, comprising a disk apparatus being connected to the central processing unit and being used by the central processing unit, and wherein the storing is performed by assigning at least one of the virtual resources further including the disk apparatus to the virtual machine, and generating an update snapshot on a basis of the obtained data.

14. The restarting method according to claim 13, wherein the storing is performed by storing each of the information of the central processing unit, the memory and the disk apparatus as respective snapshots in a different management area of the first memory.

15. The restarting method according to claim 9, wherein when a failure of the start of the first operating system is detected, the storing is performed by starting the first operating system by using an another snapshot except for the update or pre-designated snapshot, the another snapshot stored in the first memory, on a condition that the first operating system is suspended.

16. A system comprising;

a first memory; and a processor to execute a process including;

dividing a physical resource into a plurality of virtual resources, the physical resource including at least a central processing unit and a second memory;

assigning at least one of the plurality of virtual resources to a virtual machine;

detecting, by operating a second operating system, an occurrence of a failure in a first operating system that operates the virtual machine;

obtaining, by operating the second operating system, data being stored in the assigned one of the plurality of the virtual resources intermittently or periodically as a snapshot of the first operating system;

storing, by operating the second operating system, the snapshot in the first memory; and restoring, by using the second operating system, the first operating system by reconstructing the snapshot stored in the first memory upon a detection of the failure in the first operating system, wherein the storing is performed by starting the first operating system by using an update or a pre-designated snapshot on a condition that the first operating system is suspended, and resuming the first operating system on a condition that the first operating system is started, and wherein a plurality of snapshots are chronologically stored in the first memory.

* * * * *